(12) United States Patent
Bue (10) Patent No.: US 12,292,064 B2
(45) Date of Patent: May 6, 2025

(54) SHOE TREE DEVICE

(71) Applicant: Rhett Bue, Del Mar, CA (US)

(72) Inventor: Rhett Bue, Del Mar, CA (US)

( * ) Notice: Subject to any disclaimer, the term of this patent is extended or adjusted under 35 U.S.C. 154(b) by 344 days.

(21) Appl. No.: 17/833,257

(22) Filed: Jun. 6, 2022

(65) Prior Publication Data

US 2022/0386798 A1 Dec. 8, 2022

Related U.S. Application Data

(60) Provisional application No. 63/196,847, filed on Jun. 4, 2021.

(51) Int. Cl.
| | | |
|---|---|---|
| *A42B 3/14* | (2006.01) | |
| *A42B 3/04* | (2006.01) | |
| *A43D 3/14* | (2006.01) | |
| *F16B 1/00* | (2006.01) | |
| *A42B 3/12* | (2006.01) | |

(52) U.S. Cl.
CPC ............ *F16B 1/00* (2013.01); *A43D 3/1433* (2013.01); *A43D 3/145* (2013.01); *A43D 3/1458* (2013.01); *A43D 3/1475* (2013.01); *A43D 3/1483* (2013.01); *F16B 2200/83* (2023.08)

(58) Field of Classification Search
CPC .... A43D 3/145; A43D 3/1458; A43D 3/1475; A43D 3/1483; A41D 1/00; F16B 1/00; F16B 21/09; F16B 2200/20
See application file for complete search history.

(56) References Cited

U.S. PATENT DOCUMENTS

| | | | | | |
|---|---|---|---|---|---|
| 2,362,237 | A | * | 11/1944 | Bernstein | A43D 3/1475 12/116.2 |
| 2,634,439 | A | * | 4/1953 | Fitzpatrick | A43D 3/1483 12/116.2 |
| 2012/0263895 | A1 | * | 10/2012 | Jeter, Jr. | A41D 27/08 428/34.1 |
| 2013/0291317 | A1 | * | 11/2013 | Hanson | A43D 3/02 12/133 R |
| 2016/0040694 | A1 | * | 2/2016 | Cascolan | F16B 1/00 403/326 |
| 2021/0378363 | A1 | * | 12/2021 | Yang | A43D 3/1458 |

OTHER PUBLICATIONS

Stratton, Stratton Cedar Shoe Trees for Men, https://www.amazon.com/Stratton-Cedar-Trees-Wooden-Stretcher/dp/B00ATD385W?th=1 (Year: 2017).*

* cited by examiner

*Primary Examiner* — Sally Haden
*Assistant Examiner* — Giao QT Hoang
(74) *Attorney, Agent, or Firm* — Tutunjian & Bitetto, P.C.

(57) ABSTRACT

A shoe tree having a body with an exterior surface for contacting an interior surface defining a shoe interior cavity during storage. An adjustment member removably engages with a mount on a rear wall of the body of the shoe tree and is engaged to a heel member. The heel member, when rotated on the adjustment member, will increase or decrease the overall length of the shoe tree. The body portion may include an insert which has indicia thereon concerning one or both of a location of purchase or the owner of the shoe tree.

9 Claims, 5 Drawing Sheets

SHOE TREE DEVICE

This application claims priority to U.S. Provisional Patent Application Ser. No. 63/196,847 filed on Jun. 4, 2021, which is incorporated herein in its entirety by this reference thereto.

BACKGROUND OF THE INVENTION

1. Field of the Invention

The invention herein disclosed relates generally to components such as shoe trees which are employed to maintain a shape of a shoe and in some instances stretch the shoe. More particularly, it relates to a shoe maintenance device which employs a ball-shaped heel portion which removably engages with a mount positioned on one or a plurality of insertable body portions which are configured for positioning within the front cavity or toe box portion of a shoe.

2. Prior Art

Background of the Invention

A conventional shoe tree is a device which has a shoe tree body section which generally approximates the shape of a human foot and an extendable heel or rear component engaged to the body portion. Such shoe trees are conventionally placed inside a shoe, such as in the toe box, to preserve the shape of the shoe and to stop the body of the shoe from developing creases. Such shoe trees are used in many instances to thereby extend the life of the shoe.

In many instances, shoe trees, which are appropriately configured, also play an ongoing role in allowing for air flow into the shoe and for wicking away moisture caused by sweat from the interior cavity of the shoe. Such moisture can be a major cause of lining rot and leather degradation. The foot-shaped body portion of higher quality shoe trees are many times configured to help control moisture which inherently also controls odor. Foot-shaped body portions are modernly formed from hard polymeric and other materials and some employ particulate and other material to provide the moisture and odor control functions.

With respect to the above, before explaining at least one preferred embodiment of the shoe tree device and system herein, it is to be understood that the invention is not limited in its application to the details of employment and to the arrangement of the components or the steps set forth in the following description or illustrated in the drawings. The various components of the apparatus and methods and steps of employment of the disclosed device are capable of other embodiments and of being practiced and carried out in various ways. All of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other shoe shape maintenance devices and systems. It is important, therefore, that the embodiments, objects, and claims herein, be regarded as including such equivalent construction and methodology insofar as they do not depart from the spirit and scope of the present invention.

SUMMARY OF THE INVENTION

The disclosed shoe shape preservation device or shoe tree device herein provides a user configurable shoe tree for the shape preservation of their shoes. The device, unlike prior art, provides a foot-shaped body portion which is configured for insertion into the interior cavity or toe box of a shoe, which includes a mount thereon allowing for the removable pivoting engagement of an adjustment member and heel member.

The body portion of the device is configured to substantially fill the toe box or interior cavity of a shoe when placed therein. When so placed, the body portion has a mount located on a rear wall thereof which faces toward the heel of the shoe with the body portion inserted into the interior cavity or toe box of the shoe to an as-used position. By as-used position is meant that the assembled shoe tree device herein is positioned within a shoe with the body portion located in the toe box and biased toward the front of the shoe.

The mount engaged in the rear wall of the body portion has a substantially key-shaped opening therein which communicates with an internal cavity of the mount on a first side of the internal cavity. On a second side of the internal cavity is positioned a retainment ball which is biased toward the opening by a spring or other biasing member configured to do so.

A heel member of the device is engageable at a first end thereof with a second end of an adjustment member. In a preferred mode of the device, this engagement is formed by a threaded portion on the adjustment member which threadably engages with a threaded axial passage of the heel member.

In one mode of the device, which is preferred to provide a visual determination of the amount of adjustment achieved during threaded engagement of the adjustment member with the heel member, the material forming the heel member surrounding the axial passage is substantially transparent. This transparent sidewall surrounding the axial passage allows the user to visually determine how far they have translated the heel member toward or away from the heel of a shoe while in the threaded engagement with the adjustment member during use.

In a particularly preferred mode of the device, a first end of the adjustment member has a ball-shaped projection thereon which is sized for insertion through a complimentary opening in the key-shaped opening in the mount. So inserted, a planar portion of the adjustment member is sized for positioning in a slot portion of the key-shaped opening, once the user has adjusted the positioning of the heel member toward the heel end of the shoe.

The heel member, as noted, translatably engages with the adjustment member at the threaded engagement at the first end of the heel member. At a second end of the heel member is positioned a globe or ball-shaped portion. The globe or ball-shaped portion with a curved exterior is preferred in that it provides a much larger contact area with the heel end of the interior cavity of a shoe, and thereby prevents warping or other damage to the shoe.

A unique and preferred aspect of the device herein is the removable engagement of the ball-shaped projection on the adjustment member, within the cavity, in a mounted position with the planar portion of the adjustment member removably held in the slot portion of the keyhole-shaped opening. Such is provided by a contact of the spring biased retainment ball upon an upper surface of the ball-shaped projection, once the user has employed force to move the ball-shaped projection to a contact with the retainment ball. The biasing force of the retainment ball upon the ball-shaped projection maintains the planar portion of the adjustment member within the slot area. Additionally, the biasing member, urging the retainment ball toward the ball-shaped projection, also provides a means to disperse over-pressure the user might cause by over-lengthening of the adjustment member in its threaded engagement to the globe or ball-shaped portion. Where such might occur, the force of the biasing member on the retainment ball can be slightly overcome and allow the retainment ball, and the ball-shaped projection to move in a direction toward the body portion and away from the heel of the shoe. This forms somewhat of a pressure release to avoid too much force against the heel end of the shoe during use. The biasing member or spring can be one from a number of such springs where each has a differing resistance to compression and therefor a differing amount of relief from over-pressure.

This configuration allows the user to position the device to the as-used position within a shoe, with the body portion occupying the toe box or front portion of the interior cavity of the shoe and the globe-shaped portion of the heel member in a contact against the interior surface at the heel end of the shoe. So positioned, with the planar section positioned into the slot of the opening and a contact of the ball-shaped portion causing the retainment ball to slightly retract in a biased contact against the upper surface of the ball-shaped projection, the user can rotate the heel member in the threaded engagement to cause the heel member to translate toward the heel surface and lengthen the distance as desired to achieve a biased contact of the body portion against the inside of the shoe within the toe box or interior cavity.

This heel contact of the globe or ball-shaped end of the heel member, as noted, causes an urging of the foot-shaped body toward the front end of the shoe to achieve a biased contact thereof against the surface of the interior cavity of the shoe. So positioned, a biased contact of the globe-shaped portion of the heel member in contact with the interior surface of the heel end of the interior cavity and the body portion in contact with the wall of the interior cavity or toe box at the front end of the shoe, the device helps to maintain the shape of the shoe and prevent collapse and creases and the like.

In one alternative mode of the body portion, it may be formed of two sections which are biased outward toward the sidewalls of the cavity in the shoe for enhanced biased contact therewith and self adjustment to fit the size of the shoe. In another particularly preferred mode of the device, the body portion may be formed with an uneven exterior surface having ridges with recesses therebetween. This is especially preferred in that, in experimentation, it was shown that the area for moisture absorption by the body portion was significantly increased. By forming the body portion of material adapted to absorb moisture, this mode of the device with ridges and recesses provided significant improvement in moisture and order abatement while also maintaining the shape of the shoe around the shoe box.

Another mode of the device herein employs substantially smooth surfaced body portions which are configured to hold the surface around the toe box of differing shaped shoes to prevent creasing and the like. Such may be accomplished using body portions which are smooth on the exterior and which may be slightly compressible to allow them to adapt to the interior dimensions of the toe box when it is already collapsed and thereafter expand outward to tighten the shoe surface therearound. Additionally, the body portion can also be customized to the user and include a nameplate identifying the user.

The device may be provided in the form of a kit which can include a plurality of different body portions formed of differing materials and with differing exterior surfaces. Each of the body portions will have the same mount positioned on the rear wall thereof with the complimentary key-shaped opening in that mount. This will allow the user to choose the appropriate body portion for the shoes of choice and thereafter, engage the same adjustment member therewith, and then place the shoe tree device to the as-used position within the shoe.

Also, the heel member can be provided in a plurality of different heel members such as those with smaller or larger globe shapes and/or with indicia thereon so it may be given as a gift or may be sold at different venues as a souvenir of visiting that venue.

In another customization, a recess formed in the surface of the body portion, can be configured for insertion of plaques or coin-shaped inserts which may be sold at different venues for subsequent engagement to the device herein. Indicia thereon, such as letters or logos, can be of the place of purchase as a memento, such as a golf course or the like.

With respect to the above shoe tree or shoe shape maintenance device configuration description, before explaining at least one preferred embodiment herein, it is to be understood that the invention is not limited in its application to the details of operation nor the arrangement of the components or the steps set forth in the following description or illustrations in the drawings. The various methods of implementation of the shoe tree device herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other methods, devices, and systems for carrying out the several purposes of the disclosed shoe tree device herein. Therefore, the objects and claims herein should be regarded as including such equivalent construction, components, steps, and methodology insofar as they do not depart from the spirit and scope of the present invention.

It is an object of this invention to provide a shoe shape maintaining device or shoe tree, which is assembled from interchangeable components allowing customization of the assembled device by the user.

It is an additional object to provide such a shoe tree which employs a globe-shaped heel contact portion opposite the body portion sized to insert into the toe box, to enhance and enlarge the area of the curved contact of the body of the device with the interior surface of the heel of the shoe.

It is a further object of this invention to provide such a shoe tree device which is customizable to use a globe-shaped rear position which may be decorative or may have indicia thereon from a visited location such as a golf course or city or the like.

An additional object of this invention is the provision of the shoe tree device with a plurality of body portions all of which are operatively engageable with adjustment members to allow the user to employ the body portion of choice to their shoe.

These, together with other objects and advantages which become subsequently apparent, reside in the details of the construction and configurations of the shoe tree device as more fully hereinafter described and claimed, reference being had to the accompanying drawings forming a part thereof, wherein like numerals refer to like parts throughout.

Further objectives of this shoe tree invention will be ascertained by those skilled in the art as brought out in the

DETAILED DESCRIPTION OF THE PREFERRED EMBODIMENTS OF THE INVENTION

Figure 1:
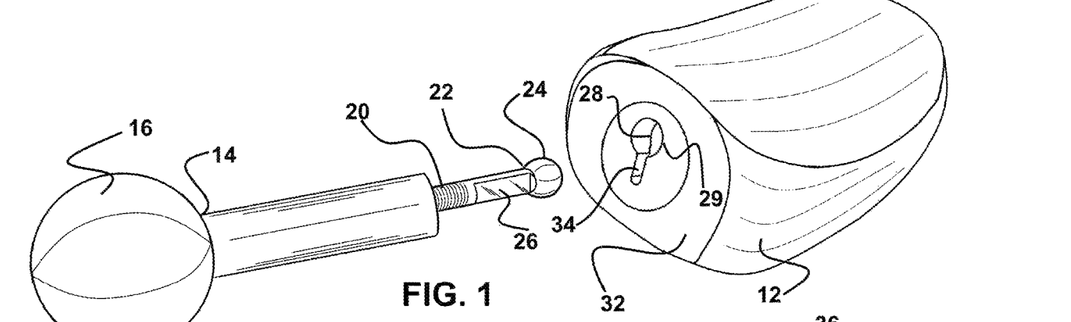
FIG. 1 depicts a perspective view of a mode of the shoe tree device herein showing a body portion positionable within the internal cavity or toe box of a shoe and a heel member removably engageable thereto by connection of an adjustment member with a mount engaged with the body portion.
Figures 2, 3:
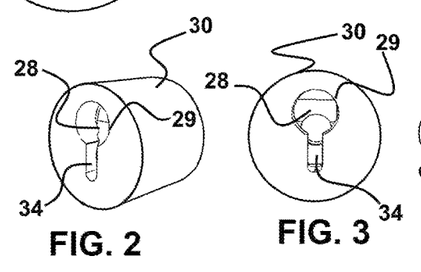
FIG. 2 shows a perspective view of the mount which is positioned in an engagement at a rear wall of the body portion of all modes of the device herein, such as shown in FIGS. 1, 11, 14 and 16 herein.
FIG. 3 shows a face of the mount and a keyhole-shaped opening formed in the mount which is adapted for removable engagement with a first end of the adjustment member shown in FIG. 1, FIG. 6 and FIG. 13.
Figures 4, 5:
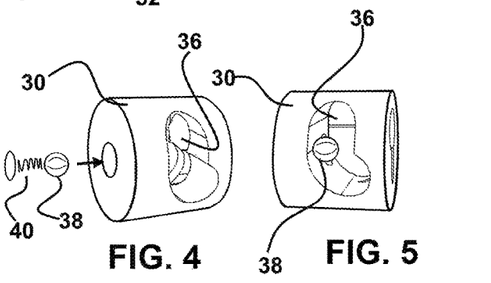
FIG. 4 shows a perspective side view of the mount showing a retaining ball which is positionable into a cavity of the mount to biased positioning, such as with a spring or other biasing member.
FIG. 5 shows the mount of FIGS. 1-3 from another side view showing the retaining ball biased by a spring or other biasing component to project from an opening communicating with the cavity, to a position to biasly contact and hold the first end of the adjusting member downwardly engaged within the cavity of the mount.

Referring now to the shoe tree device 10 herein shown in simple format by the depictions of FIGS. 1-17, there is seen in FIG. 1 a perspective view of a mode of the shoe tree device 10 herein showing a body portion 12 which is positionable within the front portion or toe box 66 (FIG. 13) of the internal cavity of a shoe to maintain a shape thereof. The body portion 12 has a first side which inserts toward and into the toe box 66 opposite an endwall 32. Also shown is a rearward or heel member 14 having a first end opposite a second end which has a globe-shaped portion 16 located at the second end thereon.

A first end of the heel member 14 has an axial passage 18 (FIG. 7) which communicates into the heel member 14. Preferably, this axial passage 18 has a threaded interior surface adapted to threadably engage with a threaded portion 20 formed on a cylindrical shaped adjustment member 22. At a first end of this adjustment member is located a ball-shaped projection 24. In between a ball-shaped projection 24 and the threaded portion 20 of the adjustment member 22 is positioned a planar area 26 of the adjustment member, where at least one surface thereof, and preferably opposing surfaces, are shaped planar rather than the round shape of the rest of the adjustment member 22.

As can be seen in the disassembled view in FIG. 1 and in FIGS. 2-5, the ball-shaped projection 24 is sized to pass through a circular portion 28 of a substantially keyhole-shaped opening 29 formed in a mount 30. The mount 30 is located in an endwall 32 of the body portion 12. The opening 29 has a narrower slot 34 opposite the circular portion 28. This key hole opening 29 communicates with a cavity 36 formed within the mount 30.

At a second end of the cavity 36, opposite the first end thereof where the opening 29 is positioned, can be seen a projecting retaining ball 38. This retaining ball 38 is engaged in a passage and biased to this projecting position by a biasing member or spring 40 or the like, such that it can be forced away from the opening 29 momentarily, but it will return to the biased projecting position thereafter. This, as noted below, provides a means to retain the planar area 26 of the adjustment member 22 within the slot 34 of the opening 29 with the device 10 in the as-used position. It also helps maintain the adjustment member 22 engaged to the mount 30 during insertion and removal of the device 10 from a shoe. Further, as noted, the retaining ball 38 can move toward the spring 40 biasing the retaining ball 38 and helping prevent potential damage to the heel of the shoe should the user over tighten the contact of the globe shaped portion 16 against the heel.

Figure 6:
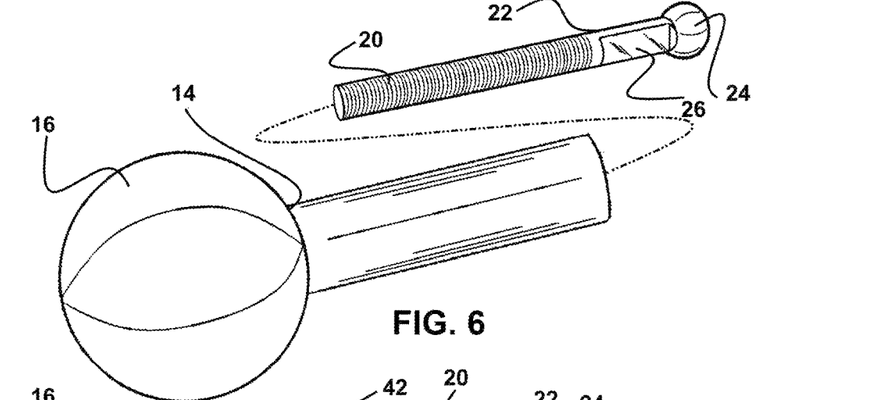
FIG. 6 depicts the adjusting member assembly having threads thereon configured to threadably engage an axial slot at a first end of the heel member, opposite the second end thereof shaped as a globe.
Figure 7:
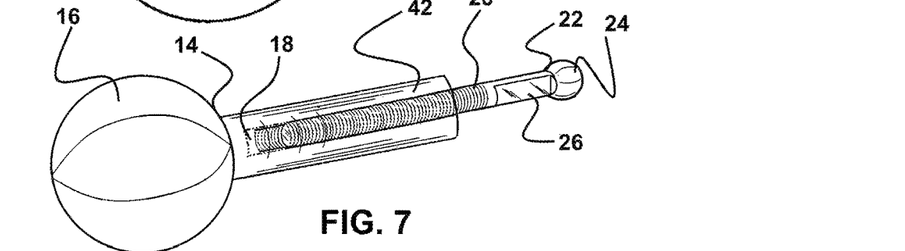
FIG. 7 shows the components of FIG. 6 operatively engaged for adjustment in length with a transparent body portion of the heel member allowing user viewing of the amount of translation of the threaded adjusting member into and out of the heel member.

As can be seen in FIGS. 6-7, the threaded portion 20 of the adjustment member 22 is threadably engageable with the threaded sidewall of the axial passage 18 positioned within the heel member 14. In use, rotation of the heel member 14 in one direction will cause translation of the threadably engaged heel member 14 toward the heel end of an internal cavity of a shoe, and rotation in the opposite direction will cause a translation of the heel member 14 away from the heel end of the shoe. In this fashion, the user can place the ball-shaped projection 24 of the adjustment member 22 through the circular portion 28 of the opening 29 and into the cavity 36 of the mount 30.

Figure 13:
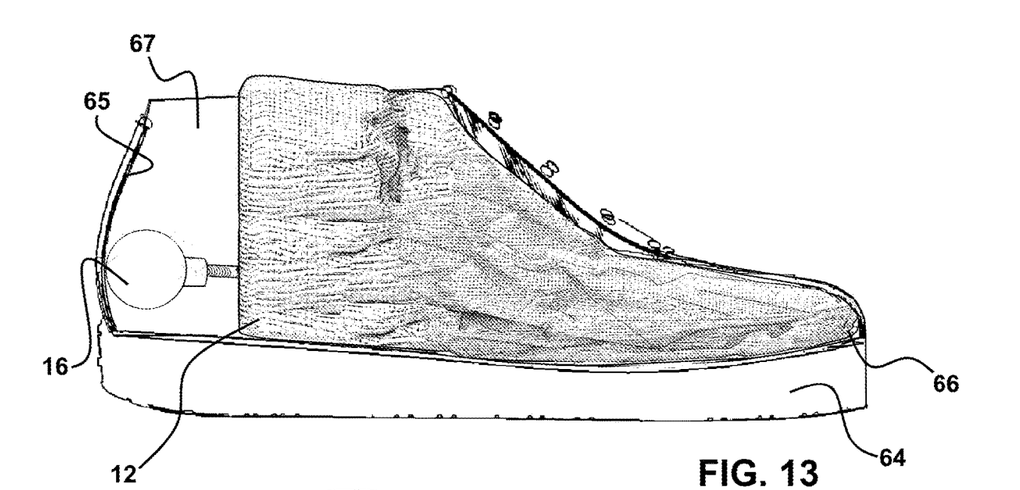
FIG. 13 shows the device herein with the body portion of FIG. 11 in an as-used position within a shoe.

Once so positioned, with the planar section engaged in the slot 34, rotation of the heel member 14, in a direction to cause the ball shaped projection 16 to translate toward the heel end of the shoe cavity, will cause the curved surface of the ball-shaped portion 16 to form a biased contact against the curved interior wall at the heel end 65 (FIG. 13) of the shoe interior cavity 67 (FIG. 13). With the planar section formed by the opposing planar areas 26 slid into engagement into the slot 34, the adjustment member 22 is held in a static position enabling the rotation of the heel member 14 without rotating the adjustment member 22 thereby allowing rotation of the heel member 14 to adjust the amount of force exerted to the device in an as-used position, such as in FIG. 13.

In a particularly preferred mode of the device 10, shown in FIG. 7, the wall 42 surrounding the axial passage 18 of the heel member 14 is formed of substantially transparent material, thereby allowing the user to view how far the threaded portion 20 of the adjustment member 22 is translated into the threaded engagement in the axial passage 18. This provides a viewable gauge to the user when rotating the heel member 14 to exert more or less biasing force to both ends of the device 10, when in an as-used position within a shoe.

Figure 8:
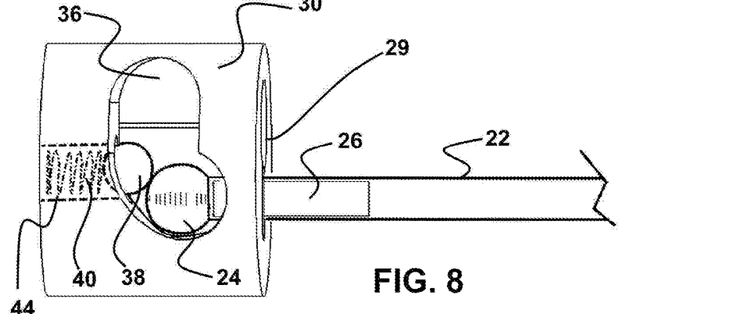
FIG. 8 depicts an enlarged side view of the body of the mount which is engaged in the endwall of all body portions herein where the retainment ball is biased against the rounded first end of the adjustment member in a removable engagement with the mount.
Figures 9, 10:
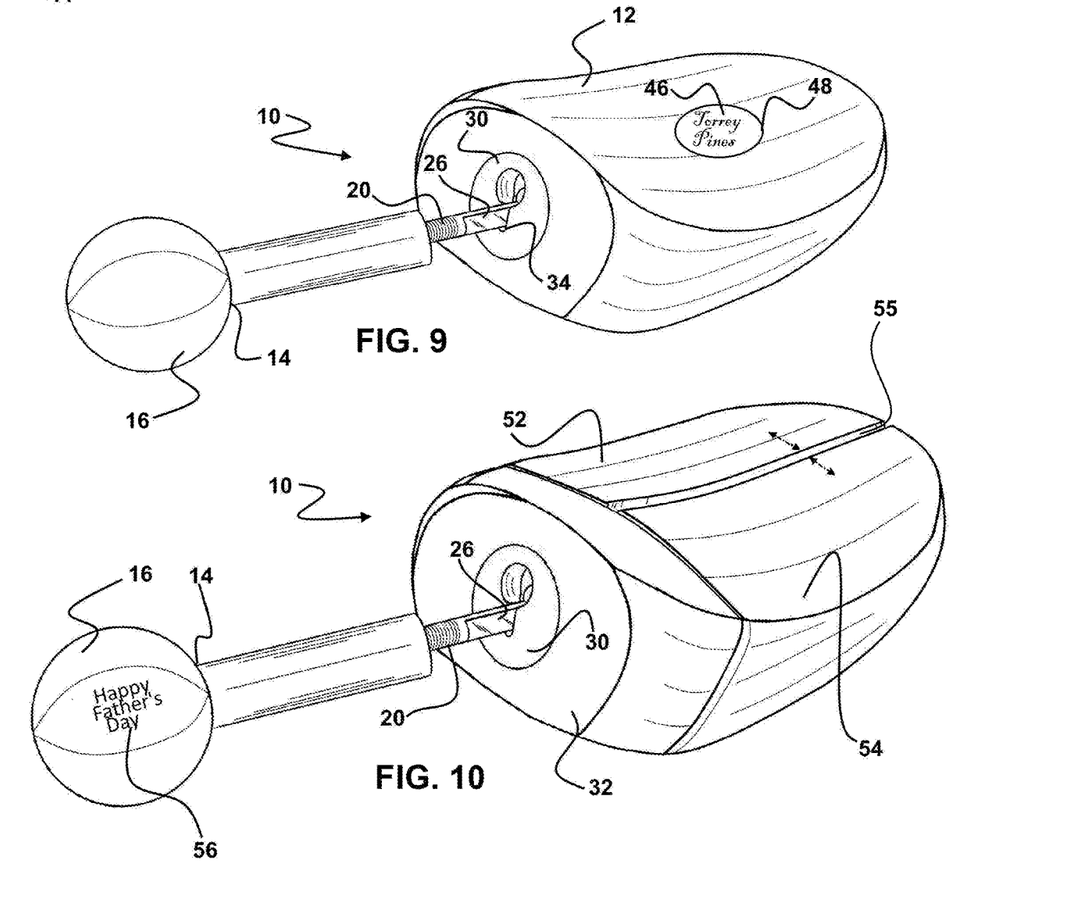
FIG. 9 shows the device, as in FIG. 1, assembled in a removable engagement of the adjustment member with the mount with a planar portion of the adjustment member engaged in a slot of the keyhole-shaped opening of the mount.
FIG. 10 depicts the device, as in FIG. 9, but shows the employment of a foot-shaped body which is biased to slide outward from a center slot.

Shown in FIG. 8 is an enlarged side view of the body of the mount 30 which is engaged into the endwall 32 (FIG. 9) of the foot-shaped body portion 12, such as in FIG. 1 or FIG. 9. As shown, the retaining ball 38 projects from a passage 44 which communicates with the cavity 36 in the mount 30. The biasing member, such as a spring 40, continuously biases the retaining ball 38 to the depicted projecting position wherein it contacts against the ball-shaped projection 24 of the adjustment member 22. In this fashion, the retaining ball 38 holds down the adjustment member 22 and maintains the planar section formed by the two planar areas 26 of the adjustment member 22 within the slot 34 of the opening 29. This maintains the device 10 in the elongated adjustment achieved by the user with the device 10 in the as-used position within a shoe interior cavity 67 and allows for adjustment by rotating the heel member 14 in the threaded engagement with the now stationary adjustment member 22.

Shown in FIG. 9 is the device 10, as in FIG. 1, fully assembled to the configuration employed in the as-used positioning, shown for example in FIG. 13, where the curved surface of the globe-shaped portion 16 contacts the heel end of the shoe interior cavity 67, and the exterior surface of the body portion 12 contacts the surface of the shoe interior cavity 67 in the toe box 66 (FIG. 13) area of the shoe 64.

Also shown in FIG. 9 is an insert 46, which is removably engageable within a recess 48 formed in the exterior of the body portion 12. There can be an infinite number of such inserts 46 available to users, all of which will removably engage within the complimentary shaped recess 48. Such inserts 46 may have indicia thereon as to a geographic location where they came from, such as a golf course where the insert 46 can be purchased as a souvenir. Such inserts 46 can also be formed with a surface on which the user may write, to provide a means to label the shoes themselves on which the device 10 is engaged.

In a current favored mode of engaging the insert 46 into the recess 48, a magnet 59 (FIG. 16) would be positioned within the recess 48 such as on the bottom surface thereof and would magnetically retain the insert 46 within the recess 48. While a frictional engagement of the insert 46 in the recess 48 would also work, it was found that magnetic 59 holding of the insert 46 worked better, should the device 10 be jarred or dropped.

Additionally shown in FIG. 9 are the two opposing preferred planar areas 26 of the adjustment member adjacent the threaded portion 20 of the adjustment member 22 which is preferably formed in a cylindrical shape so as to allow for the formation of the threaded portion 20 thereon. This planar area 26 is formed on both sides of the cylindrical adjustment member 22, thereby forming a planar section of the adjustment member 22 which is sized for sliding engagement and positioning within the slot 34 in the mount 30. By sliding engagement is meant that the diameter of the slot 34 is slightly larger than the space between the planar surface 26 on one side of the adjustment member 22 and the opposite planar surface on the opposite side of the adjustment member 22, and the formed planar section will slide into the slot 34 in a sliding contact against the sides of the slot 34.

This sliding engagement is preferred because the adjustment member 22 is held in a tighter confinement when the device is engaged in an as-used positioning, as shown as in FIG. 13, making it more stable. Further, this sliding engagement configuration provides a more stable lateral positioning of the ball shaped member end of the adjustment member 22, wherein the biased pressure of the of the retaining ball 38 against the ball shaped projection 24, as shown in FIG. 8, is constantly maintained. This is because the adjustment member 22 and the ball shaped projection 24, when located within the mount 30, cannot move sideways when held by the sliding engagement.

The engagement of the planar section formed by the two planar areas 26 within the slot 34 maintains the ball-shaped projections 24 substantially centered under the biased retaining ball 38. Further, as noted above, the depicted sliding engagement of the mirrored planar surfaces 26, forming the planar section, forms a lock to prevent further rotation of the threaded portion 20 of the adjustment member 22 and allows the user to rotate the heel member 14 to adjust the total formed length of the device 10 and the force exerted from both ends to a shoe.

Shown in FIG. 10 is a mode of the device 10 similar to that of FIG. 9. However, the foot-shaped body 12 is formed of a first portion 52 which is centrally spaced from a second portion 54 and which are biased apart along the central gap 55. The first portion 52 and second portion 54 are in a sliding engagement upon a third portion 55 of the body, such as slots on the first and second portions engaged on a projection from the third portion 55 on a wall opposite the endwall 32. When inserted into the interior cavity 67, the first portion 52 and second portion 54 will compress and narrow the gap 55 slightly and thereafter, exert an outward biased contact of each of the two portions against a respective side surface of the shoe. A biasing member, such as a spring 40 (FIG. 8) is positioned in the gap 55 to bias the two body portions away from each other.

Further shown in FIG. 10 is indicia 56 positioned on the heel member 14. In this mode, an infinite number of heel members 14 can be made available for purchase at different venues either as souvenirs of a visit to that venue where the indicia 56 indicates such or with indicia 56 which indicates some sort of celebration for the user which is commemorated. In this mode of the device 10, the different heel members 14, sold or distributed at different locations, are all configured in the fashion to engage with the adjustment member 22. Thus, the different heel members 14 can be purchased by or given to the user as mementos of a special day or as souvenirs of a visit to a location identified by the indicia 56, which, of course, may be lettering or may be a photo or artwork or a logo or other means for identifying a day, date, or location.

Figure 11:
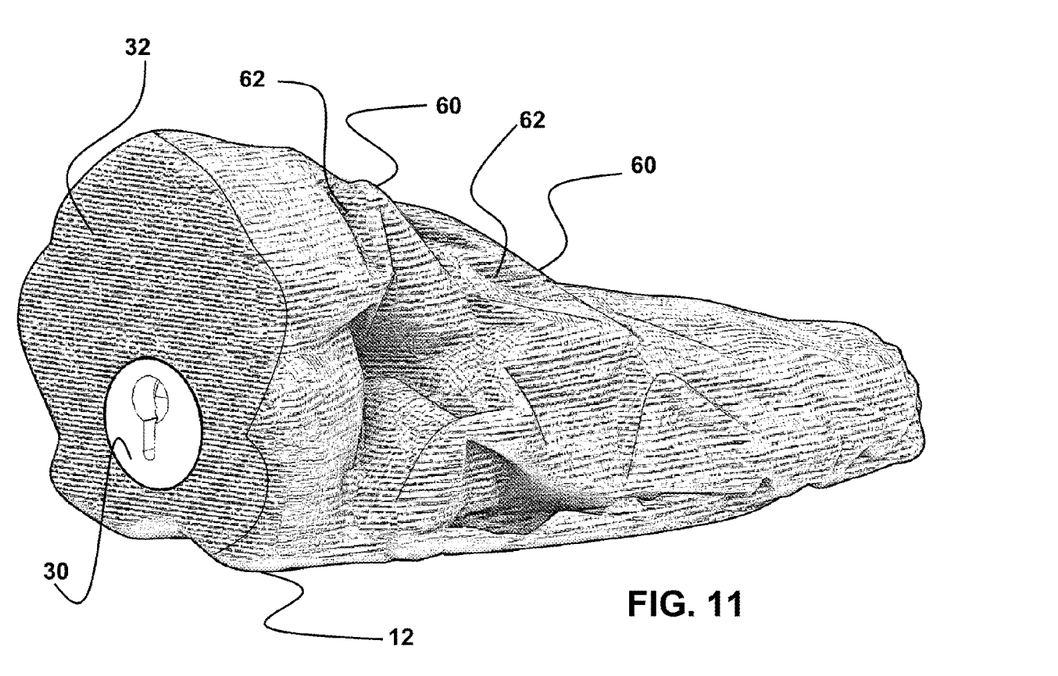
FIG. 11 depicts a particularly preferred mode of the body portion of the device herein having an exterior which includes ridges or peaks and having recesses therebetween.
Figure 12:
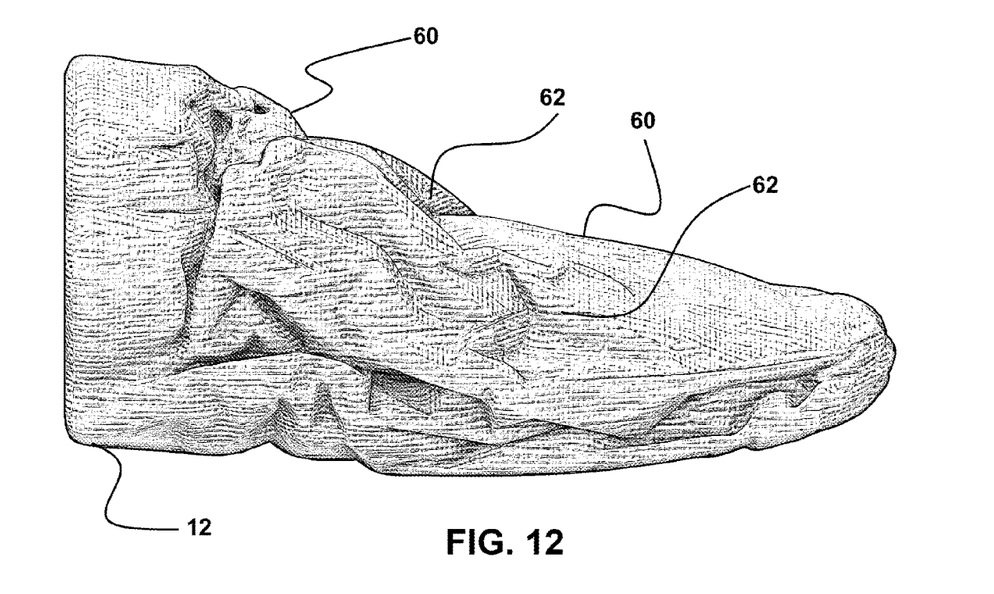
FIG. 12 is a side view of the body portion of FIG. 11.

Shown in FIGS. 11-12 is a particularly preferred mode of the body portion 12 of the device 10 herein. In this configuration of the body portion 12, the exterior surface is not smooth or even but includes ridges 60 or peaks with recesses 62 therebetween. The body portion 12, as in FIGS. 11-16, may be formed of polymeric material, such that the body portion 12 may be molded. The polymeric material forming such may have a durometer allowing for a slight compression of the exterior surface of the body portion 12 where it contacts against the interior of the shoe 64 (FIG. 13). Additionally, silver ions or other antimicrobial additives may be added to the material forming the body portion 12 to inhibit bacteria growth.

The body portion 12, as in FIGS. 11-13, is especially preferred in that it was found that the inclusion of ridges 60 and adjacent recesses 62 formed into the exterior surface of the body portion 12 provided enhanced ability to concurrently maintain shoe shape but also employ the increased surface area formed with the recesses to help vent and absorb moisture that might be in the shoe 64. The body portion 12, as in FIG. 11, is shown in FIG. 13 in the as-used positioning which locate the body portion 12 biased into the toe box 66 of the shoe 64, which as noted, is the common as-used positioning for all modes of the device 10 herein.

Figures 14, 15:
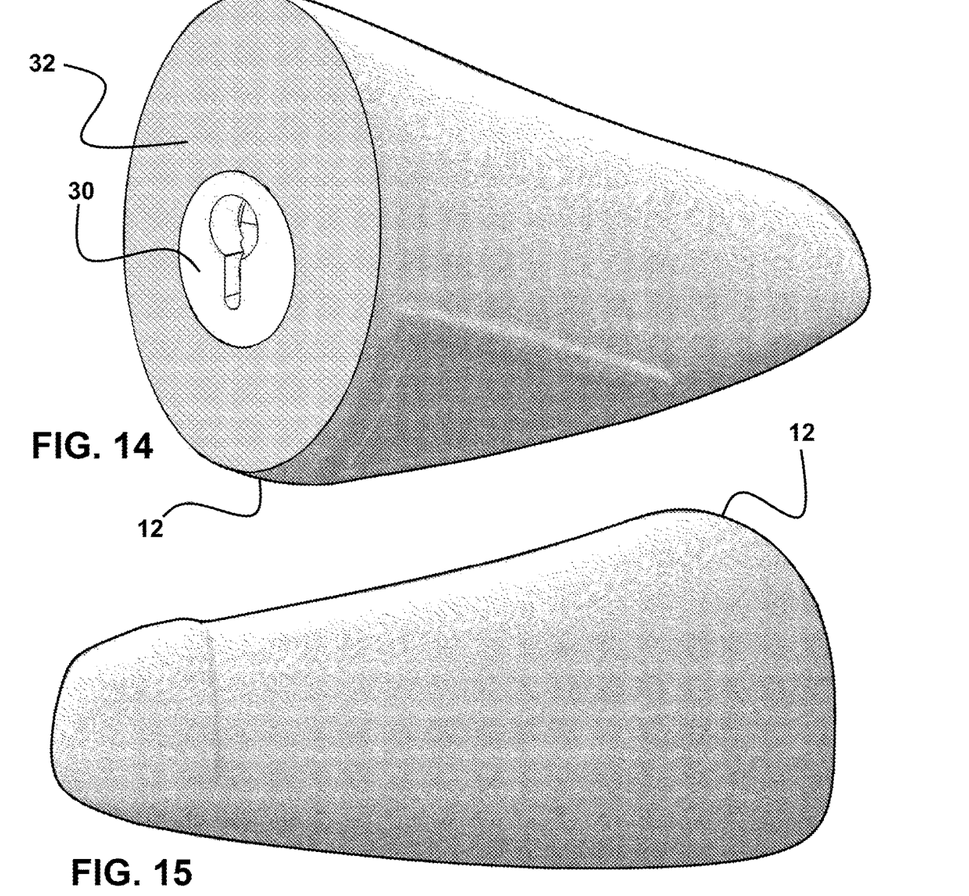
FIGS. 14-15 depict another mode of the body portion of the device herein.

Another preferred mode of the body portion 12 of the device 10 is shown in FIGS. 14-15. As shown, the mount 30, common to all modes of the device herein, is shown mounted in the endwall 32 of the body portion 12. In the mode shown in FIGS. 14-15 the body portion may be formed of a softer polymeric material, such as a closed cell foam or other polymeric material which may be molded to shape and size. Antimicrobial additives, such as silver ions or aluminum ions, can be added to the polymeric material during molding to enhance resistance to bacteria growth.

Figure 16:
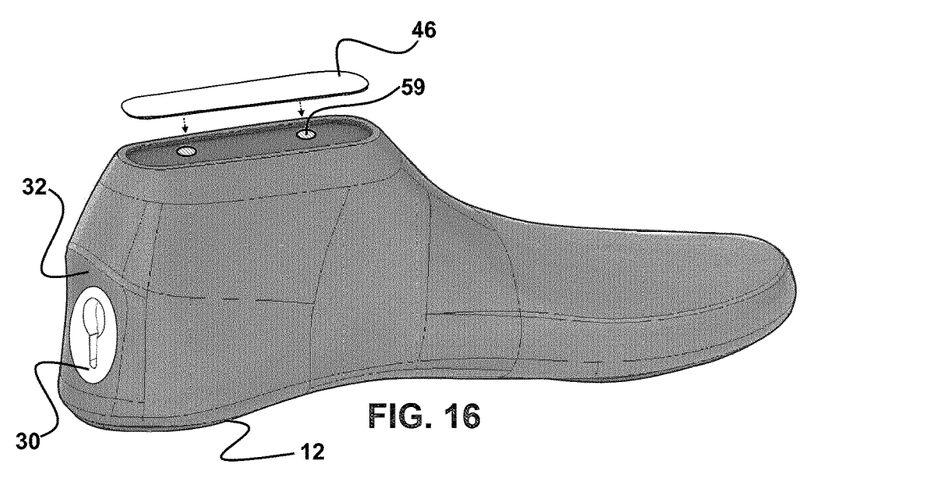
FIG. 16 shows another configuration for the body portion of the shoe tree device herein including a magnetically engageable indicia plate.
Figure 17:
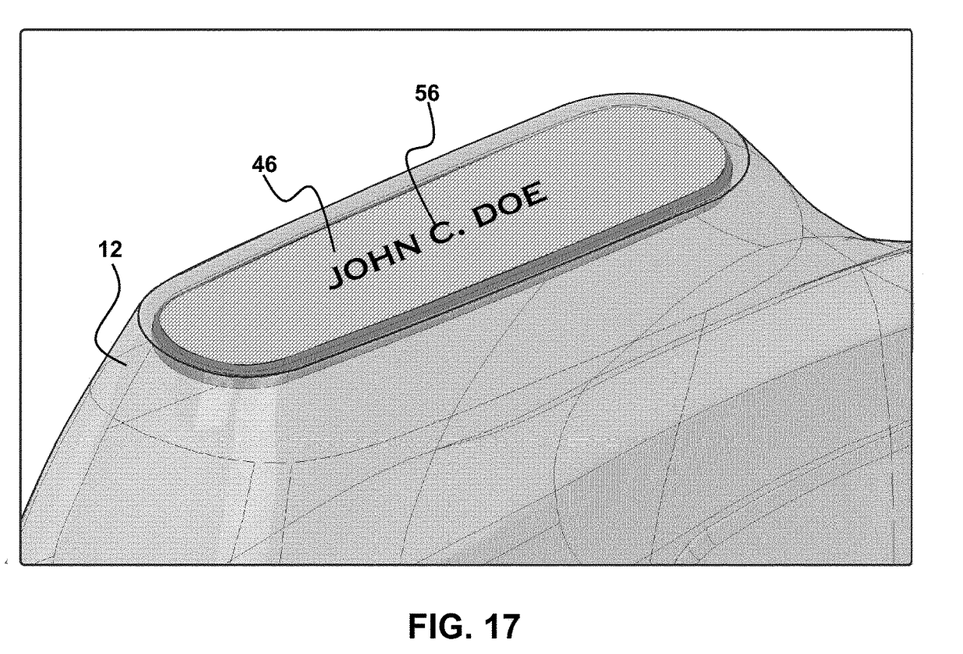
FIG. 17 shows the body portion of the device herein wherein an indicia plate is positioned within a recess or formed area on the body portion and held in place by the magnets.

In FIGS. 16-17 are depicted another configuration for the body portion 12 of the shoe tree device 10 herein which is formed to a shape similar to that of a human foot. In some modes of the device 10 the body portion 12, as in FIGS. 16-17, may be molded from polymeric material, as noted above. Alternatively, they may be printed with a 3D printer, based on a scan of the foot of the user, to yield body portions 12 which substantially match the shape of the foot of the user. This has the advantage of helping to form and maintain the shoe and the interior in the same shape as the foot of the user to maximize comfort.

An insert 46 is shown to be engageable to the body portion 12 using a magnet 59 to hold the insert 46 in place. The insert 48 can have permanent indicia 56 formed thereon, or it can be written on the surface of the insert 46. The insert 48 can have an erasable surface for such to allow for the use of felt pens to mark the insert 46 which would work well in a setting where the shoes 64 are labeled for the owner, or a date to use or pick up, or some other temporary purpose.

As noted, because of the interchangeability of the adjustment member 22 with any mount 30, the device herein can be provided in a kit wherein a plurality of different shaped body portions 12, such as those shown in FIGS. 10-16, are provided. The user can then pick the appropriately configured body portion 12 for the intended shoe and engage the adjustment member 22 with a heel member 14 threaded thereon to the mount 30 engaged in the body portion 12 chosen.

While all of the fundamental characteristics and features of the user configurable shoe tree device have been shown and described herein, with reference to particular embodiments thereof, a latitude of modification, various changes and substitutions are intended in the foregoing disclosure and it will be apparent that in some instances, some features of the shoe tree invention may be employed without a corresponding use of other features thereof, without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A shoe tree for positioning within an interior cavity of a shoe, the shoe tree having a body having a first end, a rear wall opposite the first end and an exterior surface, the first end being inserted into the interior cavity such that the exterior surface contacts an interior surface of the interior cavity, the shoe tree comprising:
   a mount positioned on the rear wall of the body and having a keyhole opening defining an upper circular larger portion and a lower planar slot portion, the upper circular larger portion having a width greater than the lower planar slot portion;
   a spherical shaped heel member having an elongated outerwall extending away from the spherical shaped heel member and having an axial threaded cavity; and
   an adjustment member having a first end and a second opposite end spaced from the first end, the first end being in threaded engagement with the axial threaded cavity and the second end having a ball shaped projection and a planar area immediately adjacent to the ball shaped projection, the ball shaped projection being configured to fit into the upper circular larger portion of the keyhole such that the planar area is received within the lower planar slot portion and thereby secures the second opposite end of the adjustment member into the body;
   wherein when the adjustment member is inserted into the mount such that the spherical heel member and body are positioned in the interior shoe cavity, rotation of the spherical shaped heel member causes axial movement of adjustment member to adjust a length of the shoe tree while positioned within the shoe interior cavity.

2. The shoe tree according to claim 1, further comprising a mount cavity in the body behind the mount, the mount cavity further comprising:
   a retaining ball located in the mount cavity;
   a biasing member biasing the retaining ball axially toward the keyhole opening such that retaining ball is in biased contact with the ball shaped projection of the adjustment member.

3. The shoe tree according to claim 2, wherein the biasing member further biases the planar portion of said adjustment member into said planar slot portion of said keyhole opening.

4. The shoe tree according to claim 1, wherein the elongated outerwall of the spherical shaped heel member comprises a transparent material such that a threaded connection between the spherical shaped heel member and the first end of the adjustment member provides a visual gauge of a position of the spherical shaped heel member relative to the body while the shoe tree is positioned within the shoe interior cavity.

5. A shoe tree for positioning within an interior cavity of a shoe, the shoe tree comprising:
   a body having a first end, a rear wall opposite the first end and an exterior surface for contacting an interior surface of the shoe interior cavity;
   a mount positioned on the rear wall of the body and having a keyhole opening defining an upper circular larger portion and a lower planar slot portion, the upper circular larger portion having a larger width than the lower planar slot portion;

a spherical shaped heel member having an elongated outerwall extending away from the spherical shaped heel member and having an axial threaded cavity; and an adjustment member having a first end and a second opposite end spaced from the first end, the first end being in threaded engagement with the axial threaded cavity and the second end having a ball shaped projection and a planar area immediately adjacent to the ball shaped projection, the ball shaped projection being configured to fit into the upper circular larger portion of the keyhole such that the planar area is received within the lower planar slot portion and thereby secures the second opposite end of the adjustment member into the body;

wherein the body and spherical shaped heel member are inserted into the interior shoe cavity, and rotation of the spherical shaped heel member causes axial movement of adjustment member to adjust a length of the shoe tree while positioned within the shoe interior cavity.

6. The shoe tree according to claim 5, further comprising a mount cavity in the body behind the mount, the mount cavity further comprising:
- a retaining ball located in the mount cavity;
- a biasing member biasing the retaining ball axially toward the keyhole opening such that retaining ball is in biased contact with the ball shaped projection of the adjustment member.

7. The shoe tree according to claim 5, wherein the elongated outerwall of the spherical shaped heel member comprises a transparent material such that a threaded connection between the spherical shaped heel member and the first end of the adjustment member provides a visual gauge of a position of the heel member relative to the body while the shoe tree is positioned within the shoe interior cavity.

8. The shoe tree of claim 5, wherein the exterior surface of the body comprises a plurality of ridges thereon for contacting an interior surface of the interior cavity of the shoe.

9. The shoe tree of claim 5, further comprising:
- a recess formed into the exterior surface of the body; and
- an identifying insert received into the recess.

\* \* \* \* \*